Aug. 4, 1942.  O. W. LIVINGSTON  2,292,137
ELECTRIC CONTROL SYSTEM
Filed June 19, 1941
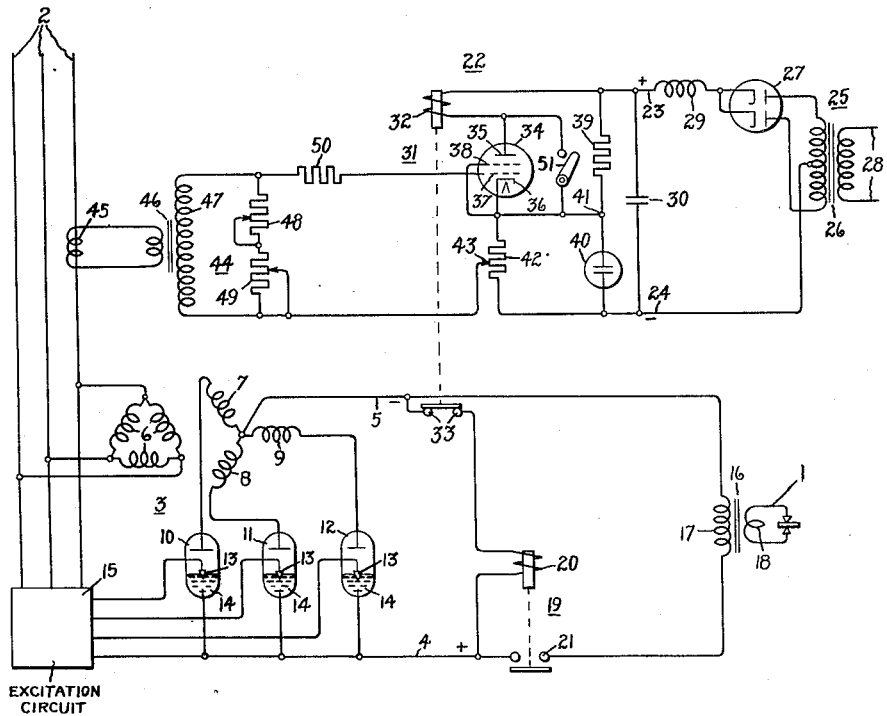
Inventor:
Orrin W. Livingston,
by Harry E. Dunham
His Attorney.

Patented Aug. 4, 1942

2,292,137

UNITED STATES PATENT OFFICE 2,292,137

ELECTRIC CONTROL SYSTEM

Orrin W. Livingston, Scotia, N. Y., assignor to General Electric Company, a corporation of New York Application June 19, 1941, Serial No. 398,808

10 Claims. (Cl. 171—97)

My invention relates to electric control systems and more particularly to electric valve control circuits for controlling the operation of electric translating apparatus.

It is frequently desirable in the control of electric translating apparatus to provide circuits which respond very rapidly to predetermined electrical conditions and which are positive and definite in their controlling operations. In accordance with the teachings of my invention described hereinafter, I provide new and improved electric control systems for effecting operation of associated equipment or apparatus in accordance with predetermined electrical conditions.

It is an object of my invention to provide a new and improved electric control system.

It is another object of my invention to provide a new and improved electric valve control system for electric translating apparatus.

It is a further object of my invention to provide a new and improved current responsive circuit for electric translating apparatus which effects the transmission of energy to a load circuit by transmitting a unidirectional current to an inductance, and which effects the transfer of energy to the load circuit from the inductance by the interruption of the current path or circuit which energizes the inductance.

It is a still further object of my invention to provide a new and improved high speed electric valve circuit for operating electroresponsive devices or relays in response to an electrical condition, such as current.

Briefly stated, in the illustrated embodiment of my invention I provide a control system for electric translating apparatus of the type in which electromagnetic energy is stored in an inductance, and in which the transfer of energy from the inductance to a load circuit, such as a welding circuit, is effected by interrupting the flow of current through the inductance. More particularly, my invention relates to an electric valve control circuit which energizes circuit controlling means or apparatus so that rapid and precise operation of this apparatus may be obtained, and which after initiation or upon initiation of its operation effects positive and definite control.

For a better understanding of my invention, reference may be had to the following description taken in connection with the accompanying drawing, and its scope will be pointed out in the appended claims. The single figure of the accompanying drawing diagrammatically represents an embodiment of my invention as applied to a system for energizing a load circuit, such as a welding circuit, from a polyphase alternating current source.

Referring now to the single figure of the drawing, I have there illustrated my invention as applied to a system for energizing a load circuit, such as a welding circuit 1, from a polyphase alternating current supply circuit 2 through electric translating apparatus 3 which energizes a direct current circuit including a positive conductor 4 and a negative conductor 5. The electric translating apparatus 3 may comprise a transformer including a plurality of primary windings 6 and secondary windings 7, 8 and 9 and associated rectifying means or electric valves 10, 11 and 12. The electric valve means 10–12 may be of the controlled type and may include immersion-ignitor control members 13 constructed of a material having an electrical resistivity relatively large as compared with that of the associated mercury pool cathodes 14. The control members 13 may be energized from any suitable excitation circuit 15 which transmits to the control members 13 impulses of current of a predetermined magnitude sufficient to render the electric valve means 10–12 conducting, and which are supplied to the control members 13 in a timed order or sequence so that the electric valve means 10–12 conduct as a polyphase rectifying system to supply power to the direct current circuit. Of course, it will be appreciated that the magnitude of the voltage impressed across the direct current circuit may be controlled by means of the excitation circuit 15 by controlling or adjusting the time of occurrence of the energizing impulses of current supplied to control members 13 during the respective positive half cycles of applied anode-cathode voltage. In this way, the magnitude of the current transmitted to the load circuit may be controlled.

The energy transmitted to the welding circuit 1 is obtained by transmitting unidirectional current to an inductance and subsequently interrupting the flow of current to transfer the stored electromagnetic energy to the welding circuit. In the particular embodiment of my invention illustrated, I have chosen to represent the inductance as being furnished by a transformer 16 having a primary winding 17 and a secondary winding 18. It will be well understood by those skilled in the art that the inductance is not limited to the particular form of transformer there illustrated.

As a means for connecting the primary winding 17 of transformer 16 to the direct current circuit including conductors 4 and 5 to effect the transmission of direct current to primary winding 17 and also to effect the interruption of the current so that at least a portion of the stored electromagnetic energy is transmitted to the welding circuit 1, I provide suitable circuit controlling means 19 which may include an actuating coil 20 and contacts 21. When the contacts 21 are closed, the primary winding 17 is connected to the direct current circuit and the relay or circuit controlling means 19 is arranged so that the contacts 21 are opened when the actuating coil 20 is not energized.

I provide a current responsive circuit 22 for controlling the operation of the circuit controlling means 19 to effect the interruption of the circuit which energizes primary winding 17 substantially instantaneously upon the occurrence of a predetermined current of the alternating current supply circuit 2. Of course, there is a definite relationship between the magnitude of the current of the alternating current supply circuit 2 and the value of the direct current transmitted to primary winding 17. Furthermore, the transformer 3 and associated rectifying equipment are arranged so that the system imposes a symmetrical or balanced three-phase load on the supply circuit 2 so that I employ an excitation circuit which is responsive to the current of one phase of circuit 2. However, my invention is not limited to the use of a circuit which is responsive to only one phase of the polyphase system and I may apply my invention with equal facility to a system in which the circuit 22 is connected to be responsive to electrical conditions of more than one phase.

The current responsive circuit 22 comprises a source of direct current including a positive conductor 23 and a negative conductor 24. The source of direct current may be provided by any suitable arrangement and I have chosen to represent the source as being supplied by a suitable bi-phase rectifier 25 including a transformer 26 and a pair of rectifying paths or unidirectional conducting paths provided by a rectifier 27. The rectifying circuit 25 may be energized from any suitable source of alternating current 28 or may be connected to supply circuit 2, if desired. I provide a filter circuit including a smoothing inductance 29 and a capacitance 30 connected across the output circuit of the rectifier 25. Capacitance 30 is charged from the direct current source and also serves as a means for providing an impulse of control current to effect precise and definite actuation of an electroresponsive relay or device 31 including an actuating coil 32 and contacts 33 which are connected to control the energization of actuating coil 20 of circuit controlling means 19. Electroresponsive device 31 is designed so that contacts 33 are biased to the closed circuit position when the actuating coil 32 thereof is not energized which, of course, establishes the condition of the circuit controlling means 19 to maintain contacts 21 thereof closed due to the energization of actuating coil 20 from the direct current circuit including conductors 4 and 5.

In order to effect the transmission of current through the actuating coil 32 in response to an electrical condition, such as the current of the supply circuit 2, I provide an electric discharge device 34 including an anode 35, a cathode 36 and control means such as a control grid 37 and a shield grid 38 which may be connected to the cathode 36. The electric discharge device 34 is preferably of the type employing an ionizable medium, such as a gas or vapor capable of supporting an arc discharge, and is arranged to transmit current in response to the potential impressed on control grid 37.

To maintain the potential of the cathode 36 at a substantially constant value and thereby to render the current responsive circuit 22 highly sensitive to slight variations in the magnitude of the current of circuit 2, I provide a voltage divider including a resistance 39 and a constant voltage means such as a glow discharge valve 40 which, when maintained in a conducting condition, maintains across its terminals a constant voltage. The common juncture 41 of resistance 39 and glow discharge valve 40 is connected to cathode 36. A suitable voltage divider including a resistance 42 proided with an adjustable contact 43 is connected across the glow discharge valve 40 and serves as a means for producing an adjustable negative unidirectional biasing potential which is impressed on control gril 37 through apparatus described immediately hereinafter.

I provide a control circuit 44 associated with the current responsive circuit 22 and which controls the potential impressed on grid 37 in response to the magnitude of the current conducted by supply circuit 2. As stated above, it will be appreciated that this voltage which is impressed on grid 37 is also indicative of the magnitude of the current transmitted to primary winding 17 of transformer 16. Control circuit 44 may include a current transformer 45 which energizes transformer 46 including secondary winding 47 across which there is connected suitable protective means, such as resistances 48 and 49, to limit the magnitude of the voltage which may be impressed on the control means of electric discharge device 34. A suitable current limiting resistance 50 may be connected in series relation with control grid 37. The lower terminal of the control circuit 44 is connected to the adjustable contact 43 so that the voltage impressed on the control grid 37 is the resultant of the alternating component of voltage appearing across secondary winding 47 and the negative unidirectional component of current appearing across the upper portion of resistance 42.

I provide suitable means for initiating operation of and resetting the current responsive circuit 22 and the circuit controlling means 19. This means may comprise a switch 51 which is connected across the anode 35 and cathode 36 of electric discharge device 34 and which when in the closed circuit position serves to by-pass the current around the electric discharge device 34 so that the negative unidirectional biasing potential derived from resistance 42 may assume control and maintain the discharge device 34 in a nonconducting condition pending a subsequent operation.

The operation of the embodiment of my invention shown in the single figure of the accompanying drawing will be explained by considering the system when it is desired to transmit an impulse of current to the welding circuit 1 in response to a predetermined circuit controlling operation. If it be assumed that the switch 51 is in the closed circuit position, the actuating coil 32 of the electroresponsive device 31 is energized, maintaining contacts 33 thereof open and, of course, effecting thereby deenergization of actuating coil 20 of the circuit controlling means 19. Consequently, contacts 21 of the circuit controlling means 19 are in the open circuit position and current is not transmitted to the welding circuit 1. The circuit for energizing actuating coil 32 of the electroresponsive device 31 includes the positive conductor 23, actuating coil 32, switch 51, resistance 42 and a negative conductor 24.

The magnitude of the voltage appearing across conductors 4 and 5 is controlled or established by adjustment of the excitation circuit 15. This circuit also permits control of the amount of power transmitted to the welding circuit.

To initiate operation of the system, switch 51 is moved to the open circuit position. Electric discharge device 34 is in a nonconducting condition prior to the opening of switch 51 and is maintained in a nonconducting condition after the opening of switch 51 by the negative unidirectional biasing potential impressed on control grid 37 and which is derived from resistance 42. Upon opening switch 51, the circuit for energizing actuating coil 32 is interrupted and since electric discharge device 34 is also nonconducting, actuating coil 32 is deenergized, effecting closure of its contacts 33. Upon closure of contacts 33, actuating coil 20 is energized from the direct current circuit including conductors 4 and 5, effecting closure of contacts 21. As soon as contacts 21 are closed, unidirectional current is transmitted to primary winding 17 of transformer 16 and the current begins to rise in this circuit at a rate determined by the voltage of the direct current circuit and the inductance of transformer 16. This direct current is, of course, furnished by the translating apparatus 3 and as soon as the current reaches a predetermined value, the current responsive circuit 22 operates to actuate electroresponsive device 31 and circuit controlling means 19. As stated above, the magnitude of the alternating current of circuit 2 is, of course, related to the magnitude of the unidirectional current transmitted to primary winding 17, and circuit 22 is adjusted so that it operates to interrupt the circuit which energizes winding 17 when the current in this winding attains a predetermined value. Upon interruption of the circuit for energizing primary winding 17 by opening contacts 21, the stored electromagnetic energy in the inductance of transformer 16 is transferred to the welding circuit 1.

The operation of the current responsive circuit 22 will now be considered in detail. Immediately upon closure of contacts 21 of circuit controlling means 19, the alternating current of circuit 2 begins to rise at a rate dependent upon the increase of the current in the circuit for energizing primary winding 17 and consequently the voltage appearing across secondary winding 47 increases at a corresponding rate. Until the alternating component of voltage produced by secondary winding 47 attains a predetermined value established by the magnitude of the current, electric discharge device 34 is maintained nonconducting by the negative biasing potential derived from resistance 42. However, as soon as the alternating component of voltage increases sufficiently relative to the magnitude of the biasing potential, the effect of the latter will be overcome and the electric discharge device 34 is rendered conducting. Consequently, unidirectional current is transmitted through actuating coil 32 of electroresponsive device 31. Inasmuch as the electric discharge device 34 is energized from a direct current circuit, the discharge device continues to conduct current to maintain coil 32 energized. Upon energizing coil 32, contacts 33 are opened and circuit controlling means 19 is deenergized. To reset the current responsive circuit 22 and the translating system, switch 51 is moved to the closed circuit position. Upon closure thereof, electric discharge device 34 is rendered nonconducting due to the low impedance path provided by switch 51 across its anode and cathode, and the negative biasing potential derived from resistance 42 serves to maintain it nonconducting during the first part of each controlling operation.

To initiate another circuit controlling operation, the switch 51 is moved to the open circuit position and the above described sequence of operation is repeated so that another impulse of current is transmitted to the welding circuit 1.

An important feature of the embodiment of my invention is the ability of the circuit to respond accurately and rapidly to slight variations in the magnitude of the current in circuit 2, and to afford positive and definite action in response to the magnitude of the current. This positive operation is obtained due to the storage of energy in electrostatic form in the capacitance 30 and the transfer of this energy in the form of current through coil 32 of electroresponsive device 31. It will be noted that control circuit 44 will operate substantially instantaneously in response to the magnitude of the current in the supply circuit 2 due to the fact that it contains no energy storage or delaying characteristics other than the inductance of transformer 46. Of course, the voltage appearing across secondary winding 47 follows very rapidly the variations in current through the primary winding so that the current responsive circuit 22 affords a high rate of response.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a direct current circuit, electric translating apparatus for energizing said direct current circuit from said supply circuit, an inductance, a load circuit connected to said inductance, circuit controlling means for connecting said inductance to said direct current circuit and for interrupting the flow of current through said inductance to transfer at least a portion of the stored electromagnetic energy of said inductance to said load circuit, and means responsive to the magnitude of the current of said supply circuit for operating said circuit controlling means.

2. In combination, a polyphase alternating current supply circuit, a direct current circuit, polyphase electric translating apparatus for energizing said direct current circuit from said supply circuit, an inductance, a load circuit connected to said inductance, circuit controlling means for connecting said inductance to said direct current circuit and for interrupting the flow of current through said inductance to transfer at least a portion of the stored electromagnetic energy of said inductance to said load circuit, and means responsive to the magnitude of the current of one phase of said supply circuit for operating said circuit controlling means.

3. In combination, a polyphase alternating current supply circuit, a direct current circuit, polyphase electric translating apparatus for energizing said direct current circuit from said alternating current circuit and comprising a plurality of rectifying devices, an inductance, a load circuit connected to said inductance, circuit controlling means for connecting said inductance to said direct current circuit and for interrupting the current through said inductance to transfer at least a portion of the stored electromagnetic energy of said inductance to said load circuit, and a current responsive circuit responsive to the magnitude of the current of one phase of said supply circuit for operating said circuit controlling means when the current attains a predetermined value.

4. In combination, a direct current circuit, an alternating current supply circuit, electric translating apparatus for energizing said direct current circuit from said supply circuit, an inductance, a load circuit connected to said inductance, circuit controlling means for connecting said inductance to said direct current circuit and for interrupting the flow of current through said inductance to transfer at least a portion of the stored electromagnetic energy of said inductance to said load circuit, a current responsive circuit for operating said circuit controlling means substantially instantaneously upon the occurrence of a current of predetermined magnitude in said alternating current supply circuit and comprising a source of direct current, a capacitance connected to be charged from said source, an electroresponsive device including an actuating coil, an electric discharge device for controlling the energization of said actuating coil, and a control circuit energized in response to the current of said supply circuit for controlling the conductivity of said electric discharge device.

5. In combination, a direct current circuit, an alternating current supply circuit, electric translating apparatus for energizing said direct current circuit from said supply circuit, an inductance, a load circuit connected to said inductance, circuit controlling means for connecting said inductance to said direct current circuit and for interrupting the flow of current through said inductance to transfer at least a portion of the stored electromagnetic energy of said inductance to said load circuit, and a current responsive circuit for controlling said circuit controlling means to effect interruption of the current through said inductance in response to the magnitude of the current of said supply circuit and comprising a source of direct current, a capacitance connected to be charged from said source, an electromagnetic device including an actuating coil, an electric discharge device having an anode-cathode circuit connected in series relation with said actuating coil and comprising a control member and means for controlling the potential of said control member to effect discharge of said capacitance through said actuating coil and said electric discharge device.

6. In combination, a direct current circuit, an alternating current supply circuit, electric translating apparatus for energizing said direct current circuit from said supply circuit, an inductance, a load circuit connected to said inductance, circuit controlling means for connecting said inductance to said direct current circuit and for interrupting the flow of current through said inductance to transfer at least a portion of the stored electromagnetic energy of said inductance to said load circuit, a current responsive circuit for operating said circuit controlling means substantially instantaneously upon the occurrence of a current of predetermined magnitude in said alternating current supply circuit and comprising a source of direct current, a capacitance connected to be charged from said source, an electroresponsive device including an actuating coil, an electric discharge device for controlling the energization of said actuating coil, and means for resetting said current responsive circuit.

7. In combination, a direct current circuit, an alternating current supply circuit, electric translating apparatus for energizing said direct current circuit from said supply circuit, an inductance, a load circuit connected to said inductance, circuit controlling means for connecting said inductance to said direct current circuit and for interrupting the flow of current through said inductance to transfer at least a portion of the stored electromagnetic energy of said inductance to said load circuit, and a current responsive circuit for controlling said circuit controlling means to effect interruption of the current through said inductance in response to the magnitude of the current of said supply circuit and comprising a source of direct current, a capacitance connected to be charged from said source, an electromagnetic device including an actuating coil, an electric discharge device having an anode-cathode circuit connected in series relation with said actuating coil and comprising a control member, means for controlling the potential of said control member to effect discharge of said capacitance through said actuating coil and said electric discharge device and means for shunting the anode-cathode circuit of said electric discharge device to reset said circuit controlling means.

8. In combination, a direct current circuit, an alternating current supply circuit, electric translating apparatus for energizing said direct current circuit from said supply circuit, an inductance, a load circuit connected to said inductance, circuit controlling means for connecting said inductance to said direct current circuit and for interrupting the flow of current through said inductance to transfer at least a portion of the stored electromagnetic energy of said inductance to said load circuit, said circuit controlling means having an actuating coil, an electroresponsive device for controlling the energization of said actuating coil, a current responsive circuit for controlling said electroresponsive device in response to the magnitude of the current of said load circuit and comprising a source of direct current, a capacitance connected to be charged from said source, an electric discharge device having a control member for controlling the operation of said electroresponsive device, a control circuit for controlling the conductivity of said electric discharge device in response to the magnitude of the current of said alternating current supply circuit, and reset means for controlling said electric discharge device and for returning said circuit controlling means to the closed circuit position.

9. In combination, an electric circuit, an electroresponsive device including an actuating coil, means for energizing said actuating coil in response to the magnitude of the current conducted by said electric circuit and including a source of direct current, a capacitance energized from said source, an electric discharge device for transmitting current through said actuating coil and comprising a control member, and means for energizing said control member in response to the magnitude of said current to effect discharge of said capacitance through said actuating coil.

10. In combination, an alternating current supply circuit, a direct current circuit, electric translating apparatus for energizing said direct current circuit from said supply circuit, an inductance, a load circuit connected to said inductance, circuit controlling means for connecting said inductance to said load circuit and for interrupting the flow of current through said inductance to transfer at least a portion of the stored electromagnetic energy of said inductance to said load circuit, and means for controlling said circuit controlling means in response to the current of said supply circuit and comprising a source of direct current, a capacitance connected to be charged from said source, an electric discharge device, means for controlling the conductivity of said electric discharge device in response to the magnitude of the current of said supply circuit, and means responsive to the conductivity of said electric discharge device for controlling said circuit controlling means.

ORRIN W. LIVINGSTON.